(12) United States Patent
Bultel et al.

(10) Patent No.: US 12,545,440 B2
(45) Date of Patent: Feb. 10, 2026

(54) ELECTRICAL DISTRIBUTION SPACECRAFT, AND ASSOCIATED METHOD

(71) Applicant: Safran Spacecraft Propulsion, Paris (FR)

(72) Inventors: Pascal Bultel, Pontault-Combault (FR); Gautier Durand, La Roquette sur Siagne (FR); Nicolas Thiry, Cannes la Bocca (FR); Marie Ansart, Roquettes (FR); Gilles Bouhours, La Roquette sur Siagne (FR); Olivier Duchemin, Magny les Hameaux (FR); Frédéric Marchandise, Vernon (FR)

(73) Assignee: Safran Spacecraft Propulson, Paris (FR)

( * ) Notice: Subject to any disclaimer, the term of this patent is extended or adjusted under 35 U.S.C. 154(b) by 0 days.

(21) Appl. No.: 18/507,602

(22) Filed: Nov. 13, 2023

(65) Prior Publication Data

US 2024/0083599 A1 Mar. 14, 2024

Related U.S. Application Data

(63) Continuation of application No. PCT/FR2022/050901, filed on May 11, 2022.

(30) Foreign Application Priority Data

May 12, 2021 (FR) .................................. 21/05056

(51) Int. Cl.
*B64G 1/42* (2006.01)
*B64G 1/40* (2006.01)
(Continued)

(52) U.S. Cl.
CPC ........... *B64G 1/4282* (2023.08); *B64G 1/401* (2013.01); *B64G 1/4024* (2023.08); *B64G 1/411* (2023.08);
(Continued)

(58) Field of Classification Search
CPC .................................................... B64G 1/4282
See application file for complete search history.

(56) References Cited

U.S. PATENT DOCUMENTS 7,423,767 B2 * 9/2008 Steinsiek ............. B64G 1/4282
356/614
8,584,443 B1 * 11/2013 Carlson ..................... F02K 9/26
60/253

(Continued)

FOREIGN PATENT DOCUMENTS

DE         102015014869         5/2017

OTHER PUBLICATIONS

International Search Report issued in corresponding International Application PCT/FR2022/050901, mailed Jul. 27, 2022.

*Primary Examiner* — Joshua J Michener
*Assistant Examiner* — Michael B. Kreiner
(74) *Attorney, Agent, or Firm* — Burris Law, PLLC (57) ABSTRACT

A spacecraft for the distribution of electrical energy to client craft at points situated in free space, in orbit and/or on a celestial body includes a main structure equipped with an electric thruster, with a chemical thruster and with a solar generator, a first fuel container for fuel intended for the electric thruster, and a second fuel container for fuel intended for the chemical thruster. The spacecraft is able to be modulated such that the main structure can be coupled/decoupled alternatively to/from the first container or the second container, the first container and the second container are able to be coupled/decoupled to/from one another, and the solar generator can be deployed or retracted.

16 Claims, 9 Drawing Sheets

(51) Int. Cl.
   *B64G 1/64* (2006.01)
   *B64G 1/62* (2006.01)
(52) U.S. Cl.
   CPC .......... *B64G 1/6462* (2023.08); *B64G 1/4026* (2023.08); *B64G 1/625* (2023.08); *B64G 1/646* (2013.01)

(56) References Cited

U.S. PATENT DOCUMENTS

| | | | |
|---|---|---|---|
| 8,820,353 B2* | 9/2014 | Yandle | B64G 1/4022 |
| | | | 137/614.04 |
| 9,284,069 B2* | 3/2016 | Bigelow | B64G 1/4282 |
| 9,914,550 B1* | 3/2018 | Price | B64G 1/10 |
| 10,336,475 B1* | 7/2019 | Delgado | B64G 1/2427 |
| 10,442,558 B2* | 10/2019 | Duchemin | B64G 1/415 |
| 10,532,833 B2* | 1/2020 | Duchemin | B64G 1/404 |
| 10,934,027 B2* | 3/2021 | Ustamujic | B64G 1/44 |
| 11,352,150 B2* | 6/2022 | Parman | B64G 1/4024 |
| 11,492,148 B2* | 11/2022 | Nicholson | B64G 1/646 |
| 11,643,227 B2* | 5/2023 | Halsband | B64G 1/64 |
| | | | 244/172.5 |
| 2003/0164428 A1* | 9/2003 | Anderman | B64G 1/6464 |
| | | | 244/172.4 |
| 2010/0038491 A1* | 2/2010 | Cepollina | B64G 1/242 |
| | | | 244/172.5 |
| 2012/0000575 A1 | 1/2012 | Yandle et al. | |
| 2015/0021439 A1* | 1/2015 | Duchemin | B64G 1/42 |
| | | | 244/171.1 |
| 2019/0248515 A1* | 8/2019 | Hakamada | B64G 1/402 |
| 2021/0197987 A1* | 7/2021 | Kokorich | B64G 1/365 |

\* cited by examiner

ELECTRICAL DISTRIBUTION SPACECRAFT, AND ASSOCIATED METHOD

CROSS-REFERENCE TO RELATED APPLICATIONS

This application is a continuation of International Application No. PCT/FR2022/050901, filed on May 11, 2022, which claims priority to and the benefit of FR 21/05056 filed on May 12, 2021. The disclosures of the above applications are incorporated herein by reference.

FIELD

The present disclosure relates to distribution of electrical energy by a spacecraft and a method for distributing electrical energy using such a spacecraft.

BACKGROUND

The statements in this section merely provide background information related to the present disclosure and may not constitute prior art.

Today, space missions are planned to provide electrical energy to a client craft at a point in the free space, in orbit or on a celestial body.

Depending on the needs of the mission and the position of the client craft to be supplied with electricity, it may be difficult to supply the client craft with electricity. In all cases of one-off missions, the used solar electrical energy generators today are intended to accomplish missions for distributing electrical energy to a client craft located at a point in the free space, in orbit and/or on a celestial body and cannot be used for other electrical energy distribution missions. As a result, in existing missions, the operational area covered for the distribution of electrical energy is limited.

Moreover, the use of several distinct systems, among others, a launch system, a space transfer and/or orbit circularization system and a descent system require the use of high mass equipment making such electrical energy distribution missions costly.

On the other hand, the fuel containers planned for these missions or payloads to be brought to the same client craft to be supplied with electrical energy or on site can be put into Earth's orbit by launchers distinct from the launcher planned for placing the solar electrical energy generator into Earth orbit.

Furthermore, the solar electrical energy generators have the disadvantage of providing a small quantity of electrical energy (a few kW) to the client craft that must be powered.

SUMMARY

This section provides a general summary of the disclosure and is not a comprehensive disclosure of its full scope or all of its features.

It is desired to implement several distinct systems to bring a solar electrical energy generator to a position of a client craft and supply the craft with electrical energy. In the case of complex missions, it is desired to provide a launch system intended to bring the solar electrical energy generator into space, a transfer and/or orbit circularization system in space to ensure the transit in space of the solar electrical energy generator, and a descent system ensuring the descent of the solar electrical energy generator onto a celestial body.

For example, in the case of a mission dedicated to the distribution of electrical energy to a client craft located in the free space or in orbit, the solar electrical energy generator is loaded onto a spacecraft equipped with a transfer and/or orbit circularization system. The spacecraft previously placed in Earth's orbit brings the solar electrical energy generator to the client craft. The solar electrical energy generator can then be separated from the transfer and/or orbit circularization system to be connected to the client craft to distribute electrical energy until the spacecraft reaches the mission duration, without being able to be exploited for the purposes of new missions.

In another example, the solar electrical energy generator, also previously placed in Earth's orbit, may be intended to distribute the electrical energy to a client craft located on a celestial body. The solar electrical energy generator can be embedded as a payload on a descent system allowing the landing of the solar electrical energy generator on the celestial body. Once on the ground, the solar electrical energy generator can be unloaded from the landing system to be connected to the client craft and distribute the electrical energy until the mission duration is reached, also without being able to be operated for the purposes of new missions.

In one form the disclosure provides a spacecraft for distributing electrical energy to client craft. The spacecraft comprises: a main structure equipped with an electric thruster, a chemical thruster, and a solar electrical energy generator with variable geometry; at least one first fuel container intended for the electric thruster; and at least one second fuel container intended for the chemical thruster. The spacecraft is modular to removably couple the main structure to the first container for supplying fuel to the electric thruster, or to the second container for supplying fuel to the chemical thruster, and to removably couple the first container and the second container to each other. The solar electrical energy generator is configured to be: deployed to distribute electrical energy to a first client craft located at a first point in the free space, in orbit or on a first celestial body, and to displace the spacecraft toward a second client craft located at a second point in the free space, in orbit or on a second celestial body, and retracted to carry out mooring phases with the first or second client craft in the free space or in orbit, as well as landing phases towards a third celestial body and taking-off phases from the third celestial body to return to orbit.

The term "electric thruster" means an electric propulsion unit comprising one or more motor(s).

The term "chemical thruster" means a chemical propulsion unit comprising one or more motor(s).

The term "retracted to allow a displacement of the spacecraft towards another client craft" means that the displacement includes, among other things, docking phases on the other client craft, and descent phases.

Such a spacecraft has the advantage of combining several functions in the same spacecraft, such as: to launch from a celestial body of the spacecraft into the space using the chemical thruster; to transfer and/or the circularization of the craft in the space, as well as distribution of electrical energy to the client craft to which electrical energy is brought; and distribution of electrical energy to the client craft using the solar electrical energy generator.

The term "removably coupling" means, for example, a first element which is mechanically detached from a second element to be mechanically attached to a third element. The intermediate state between the detachment and the attachment of the first element corresponds to a transient state in which the first element is mechanically detached from the second element and the third element.

The combination of these functions facilitates the distribution of electrical energy at any point to client crafts located at different points in the free space, in orbit and/or on a celestial body. Thus, such a spacecraft can be planned to successively carry out several missions of distributing electrical energy to client crafts located in the free space, in orbit or on a celestial body and be accomplished in an autonomous manner. For example, such a spacecraft can carry out a first mission of distributing electrical energy in the free space or in orbit to a first client craft before carrying out a second mission of distributing electrical energy on a celestial body to a second client craft. The present disclosure is of course not limited to this example of a mission and can be used in any combination of missions exploitable by the present disclosure. For example, a first mission of distributing electrical energy to a client craft located on a celestial body such as the Moon, followed by a second mission of distributing electrical energy to another client craft located on another celestial body.

The main structure comprising the electric thruster, the chemical thruster and the solar electrical energy generator with variable geometry form an integrated functional assembly. Nonetheless, provisions may be made for the electric thruster to be decoupled from the main structure to be replaced. The client crafts can be, for example, inhabited infrastructures, production infrastructures, research infrastructures (microgravity), computing centers, or heavy assembly systems. The chemical thruster facilitates landing and placing, in orbit of the main structure, on or from a celestial body other than the Earth. The electric thruster facilitates transit in the free space or in orbit of the main structure. By celestial body is meant a body distinct from the Earth and equipped with a ground such as a planet, a moon, or an asteroid. In one form, the chemical thruster may be a monopropellant or bipropellant thruster. The fuel contained in the first container is, in one form monopropellant or bipropellant. In a variation, the electric thruster may be a gridded ion motor thruster or a Hall current thruster. The fuel of the electric thruster, in one form, is an inert gas, or a monatomic gas such as Xenon, Argon or Krypton.

According to a form, the solar electrical energy generator comprises flexible photovoltaic cells configured to be wound and unwound about the same axis. According to a variation, the solar electrical energy generator with variable geometry comprises at least two photovoltaic cells or flexible canvas which can be folded and unfolded relative to the same axis.

Documents FR 2 998 876 and FR 3 024 227 disclose the use of such flexible photovoltaic cells or flexible canvases. As described in these documents, such a flexible canvass can be rolled up or unwound using a deployable structure or device as described in these documents. Documents FR 2 998 876 and FR 3 024 227 are fully incorporated herein by reference into this description. For this purpose, the deployable structure or device and its method, if applicable, may be associated with the present spacecraft. In the present description, the term "wound" means a retracted state and the term "unwound" means a deployed state.

According to a form, the spacecraft comprises a supporting structure for carrying a payload, the supporting structure being configured to be coupled and decoupled to/from the first container and the second container.

According to a form, the solar electrical energy generator is equipped with a system of transferring electrical energy by wire and/or by short distance waves and/or by laser. Optionally, the system of transferring wired electrical energy can be connected to the client craft using a robotic arm or manually by an astronaut.

According to a form, the main structure comprises at least one third fuel container intended for the chemical thruster to facilitate the spacecraft to return to orbit from a celestial body. The at least one third container forms a fuel reserve facilitating the spacecraft to take off again from the celestial body. Such a third container can be attached to the main structure and coupled to the spacecraft to supply fuel to the chemical thruster to provide the placement of the spacecraft into orbit from the celestial body. The fuel contained in the third container is, in one variation, monopropellant or bipropellant.

According to a form, the main structure comprises docking systems configured to couple the spacecraft to a client craft. Such docking systems assist in stabilizing the spacecraft at the client craft to facilitate the distribution of electrical energy to a client craft located in orbit or in the free space.

According to a form, the main structure comprises landing systems configured to facilitate the spacecraft to land on a celestial body.

According to a form, the spacecraft comprises fuel transfer systems to provide the refueling of the spacecraft. For example, the spacecraft could be planed for a refueller cargo ship to provide the refueling of the spacecraft using fuel transfer systems. Such refueling systems can be formed by connectors and distribution conduits. Such fuel transfer systems may be provided to refuel the spacecraft for chemical propulsion or electric propulsion.

In one form, the present disclosure may also relate to a method for distributing electrical energy to at least one client craft located at a point in the free space, in orbit or on a celestial body, using a spacecraft as defined previously. The method comprises a transit step of the spacecraft previously placed in orbit, such that the spacecraft moves towards a client craft located in the free space, in orbit or on another celestial body, using the electric thruster and the solar electric power generator deployed after the spacecraft is placed into orbit.

According to a form, the method comprises steps of docking the spacecraft to a client craft located in the free space or in orbit; and distributing the electrical energy produced by the solar electrical energy generator to the client craft.

According to a variation, the method comprises steps of: placing the spacecraft into orbit around the celestial body; retracting the solar electrical energy generator; decoupling the first container from the main structure; coupling the main structure to the second container; decoupling the first container from the second container; landing the spacecraft on the ground of the celestial body; deploying the solar electrical energy generator; and distributing the electrical energy generated by the solar electrical energy generator to a client craft on the celestial body.

According to a form, the spacecraft comprises the previously defined supporting structure carrying a payload. In the case of the supporting structure carrying a payload, the method comprises a step of unloading the main structure on site of the client craft or to assist the client craft in refueling. The supporting structure is advantageously arranged between the first container and the second container.

According to a form, in the case of continuing an electrical energy distribution mission to another client craft, the method comprises steps of retracting the solar electrical energy generator; filling the second container or alternatively coupling the at least one third container to the main structure to supply fuel to the chemical thruster; and taking-off to bring the spacecraft into orbit around the celestial body.

According to a variation, the method comprises steps of decoupling a third container from the main structure; refueling, in orbit or in the free space, the electric thruster and chemical thruster; and transiting the spacecraft to a client craft. The refueling step may consist of refueling the first container and/or the second container or alternatively, equipping the spacecraft with another first container and another second container pre-filled with fuel. In the case of refueling the first container and/or second container, the latter will have been previously collected.

According to other aspects, the method comprises a step of transiting the spacecraft to another client craft located in the free space, in orbit or on a celestial body using at least the electric thruster and using the solar electrical energy generator deployed after the placement of the generator in orbit.

In one form, the present disclosure may also relate to a spacecraft for distributing electrical energy to client craft at points located in the free space, in orbit and/or on a celestial body, the spacecraft comprising: a main structure equipped with an electric thruster, a chemical thruster and a solar electrical energy generator with variable geometry, at least one first fuel container intended for the electric thruster, at least one second fuel container intended for the chemical thruster. The spacecraft being modular in order to couple: the main structure alternatively to the at least one first container for supplying fuel to the electric thruster or to the at least one second container for supplying fuel to the chemical thruster, the at least one first container and the at least one second container capable of being coupled/decoupled to/from one another. The solar electrical energy generator with variable geometry being intended to be: deployed to provide electrical power distribution to a client craft located at a point in the free space, in orbit or on a celestial body, and to displace the spacecraft to another client craft located at an another point in the free space, in orbit or on another celestial body, retracted to perform docking phases in the free space or in orbit, as well as landing phases towards a celestial body and taking-off phases from a celestial body to return to orbit.

According to a form, the solar electrical energy generator with variable geometry comprises flexible photovoltaic cells which can be wound and unwound about the same axis.

According to a variation, the solar electrical energy generator is equipped with a system of transferring electrical energy by wire and/or by short distance waves and/or by laser.

According to a form, the spacecraft comprises a supporting structure for carrying a payload. The supporting structure being intended to be coupled/decoupled to/from the at least one first container and to the at least one second container.

According to a form, the main structure comprises at least one third fuel container intended for the chemical thruster for providing ascent of the spacecraft into orbit from a celestial body.

According to a variation, the main structure comprises docking systems for coupling the spacecraft to the client craft.

According to a form, the main structure comprises landing systems for landing the spacecraft on a celestial body.

According to a form, the spacecraft comprises fuel transfer systems for refueling the spacecraft.

In one form, the present disclosure may also relate to a method for distributing electrical energy to client craft at points located in the free space, in orbit and/or on a celestial body to at least one client craft using a spacecraft as defined previously, the spacecraft being previously placed in orbit. The method comprising a step of transiting the spacecraft towards a client craft located in the free space, in orbit or on a celestial body using at least the electric thruster and using the solar electrical energy generator deployed after placement of the generator in orbit.

According to a form, in the case of a client craft in the free space or in orbit, the method comprises: a step of docking the spacecraft with the client craft; and a step of distributing the electrical energy produced by the solar electrical energy generator to the client craft.

According to a form, in the case of a client craft on a celestial body, the method comprises: a step of placing the spacecraft into orbit around the celestial body; a step of retracting the solar electrical energy generator; a step of decoupling the first container from the main structure; a step of coupling the main structure to the second container; a step of decoupling the first container from the second container; a step of landing the spacecraft on the ground of the celestial body; a step of deploying the solar electrical energy generator; and a step of distributing the electrical energy generated by the solar electrical energy generator.

According to a variation, in the case of continuing the mission of distributing electrical energy to another client craft, the method comprises: a step of retracting the solar electrical energy generator; a step of filling the second container or, alternatively, a step of coupling the at least one third container to the main structure for supplying fuel to the chemical thruster; and a taking-off step to bring the spacecraft into orbit around the celestial body.

According to a form, when the spacecraft is equipped with at least one third container the method comprises: a step of decoupling the at least one third container from the main structure; a step of refueling in orbit or in the free space for the electric thruster and the chemical thruster of the spacecraft, and a step of transiting the spacecraft to another client craft.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
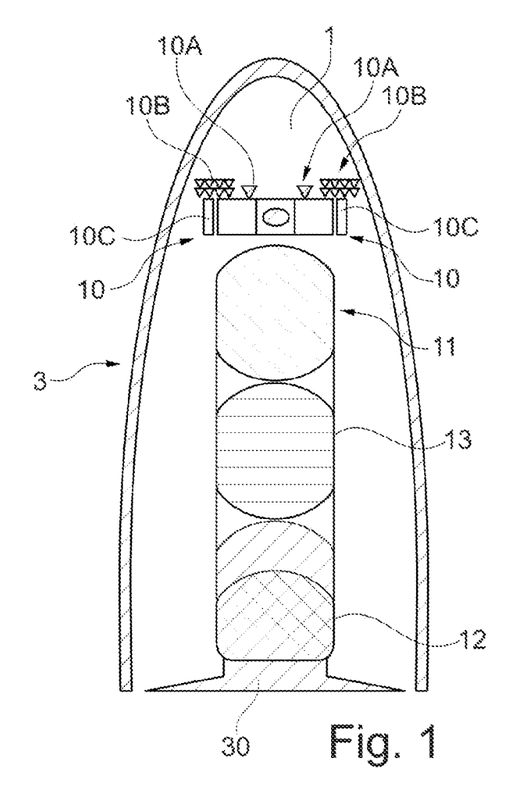
FIG. 1 represents a schematic view of a spacecraft, according to a form, equipped with a main structure, a first container, a supporting structure of a payload and a second container and mounted on a launcher for placing the spacecraft in Earth's orbit according to the present disclosure.

In FIG. 1, a spacecraft 1 is shown for distributing electrical energy to a client craft 2 at points located in the free space, in orbit and/or on a celestial body.

The spacecraft 1 comprises a main structure 10, at least one first fuel container 11, a supporting structure 13 of a payload and at least one second fuel container 12 stacked and arranged in a single launcher 3. Thus, placing the spacecraft 1 into Earth's orbit may use a single launcher 3.

The main structure 10 is equipped with thrusters, namely an electric thruster 10A and a chemical thruster 10B. Moreover, the main structure 10 is equipped with a solar electrical energy generator 10C forming an integral part of the main structure 10.

The first container 11 forms a fuel tank intended for the electric propulsion. The fuel of the first container 11 can be an inert gas, such as Xenon, argon or Krypton. The second container 12 forms a fuel tank intended for the chemical propulsion. The fuel of the second container 12 can be a monopropellant or a bipropellant, liquid and/or solid.

The supporting structure 13 is intended for carrying a payload intended for the client craft 2 or the site of the client craft 2.

In one variation, the spacecraft 1 has a modular configuration so that the spacecraft 1 can be adapted to the needs of several consecutive missions. As such, the supporting structure 13, the first container 11 and the second container 12 form a logistic stack and can be coupled or decoupled from each other. The main structure 10 can alternatively be coupled/decoupled to/from the first container 11 or to/from the second container 12.

The arrangement of the supporting structure 13 arranged between the first container 11 and the second container 12 has the advantage of enabling the main structure 10 to be able to be supplied with fuel for the electric propulsion or for the chemical propulsion.

The main structure 10 is equipped with a control unit facilitating the transit of the spacecraft 1 and these maneuvers. When the main structure 10 is coupled to the first container 11, the supply of fuel to the electric thruster 10A is facilitated, Whereas when the main structure 10 is coupled to the second container 12, the supply of fuel to the chemical thruster 10B is facilitated. The control unit is configured to provide the coupling and decoupling of the main structure 10 to one of the containers 11, 12 depending on mission needs.

In an initial configuration planned for placing the spacecraft 1 into Earth's orbit, the main structure 10 is coupled to the first container 11 for powering the electric propulsion, to facilitate the transit of the spacecraft 1 in space once in Earth's orbit.

The solar generator 10C has variable geometry. In other words, the solar generator 10C is intended to be deployed or retracted depending on mission needs. The solar generator 10C is intended to be deployed to provide the distribution of electrical energy to a client craft 2 located at a point in the free space, in orbit or on a celestial body, and retracted to allow the displacement of the spacecraft 1 towards another client craft 2 located at another point in the free space, in orbit or on another celestial body. The solar generator 10C may comprise flexible photovoltaic cells or a flexible canvas of photovoltaic cells that can be wound and unwound about the same axis, so that the unwound cells cover a large surface of solar radiation. Thus, such photovoltaic cells significantly increase the production and distribution capacity of electrical energy of the spacecraft 1.

Successive missions using the spacecraft 1, according to a form, facilitate the distribution of electrical energy to client crafts 2 at points in the free space, in orbit or on a celestial body. The configuration of FIG. 1 represents a spacecraft 1 placed in a launcher 3 to place the spacecraft 1 in Earth's orbit from a launch site.

The spacecraft 1, as described above, forms a stack that can fit in a single launcher 3. The second container 12 of the spacecraft 1 is coupled to a base 30 of the launcher 3 for the stable maintenance of the spacecraft 1 during the placement phase of the spacecraft 1 in Earth's orbit.

Figure 2:
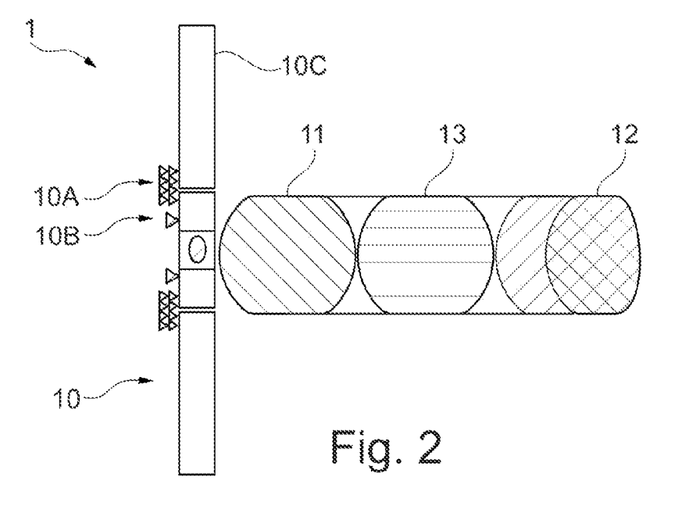
FIG. 2 shows a schematic view of the spacecraft placed in Earth's orbit according to the present disclosure.

FIG. 2 shows the spacecraft 1 in Earth's orbit where the spacecraft 1 was detached from the base 30 of the launcher 3 and separated from the launcher 3. Once placed in Earth's orbit, the solar generator 10C can be deployed. A step of transferring the spacecraft 1 to a client craft 2 can then be initiated using electric propulsion powered by the electrical energy supplied by the deployed solar generator 10C and by the fuel from the first container 11 to which the main structure 10 is coupled.

In a configuration of a first mission intended to distribute the electrical energy to a first client craft 2 (see FIG. 8) in the free space or in orbit, docking systems can be provided for coupling the spacecraft 1 to the client craft 2.

Figure 3:
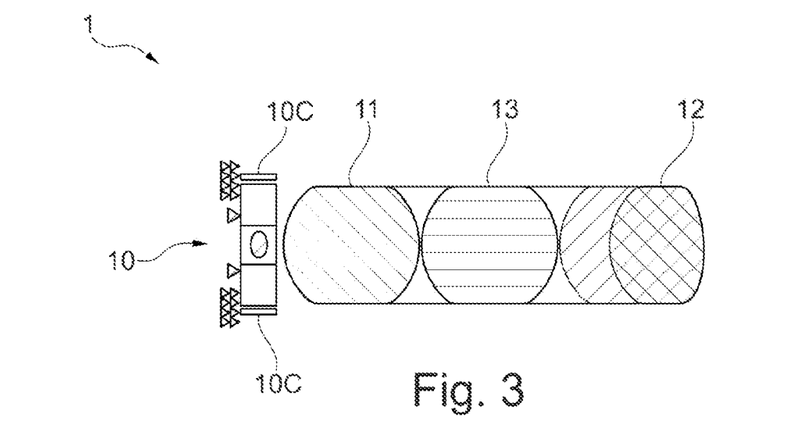
FIG. 3 represents a schematic view of the spacecraft in a step of retracting the solar electrical energy generator of the spacecraft which the spacecraft carries for landing on a celestial body according to the present disclosure.

The solar generator 10C is equipped with a system of transferring electrical energy by wire and/or by short distance waves and/or by laser and can, once deployed, distribute the electrical energy to the client craft 2. During the docking phase the solar generator 10C will be retracted and deployed once the docking phase is completed. The spacecraft 1 can then carry out an electrical energy distribution mission successively to the one the spacecraft 1 has just accomplished. The spacecraft 1 can be directed towards a celestial body such as the Moon on which a second client craft 2 is placed on the ground. The spacecraft 1 is first placed into orbit around the celestial body comprising the second client craft 2. Then, as illustrated in FIG. 3, the solar electrical energy generator 10C is retracted to prepare the landing phase of the spacecraft 1 on the ground of the celestial body. The spacecraft 1 comprises landing systems configured to provide the landing phase. For example, the spacecraft 1 comprises a landing gear 16 (see FIG. 6).

Figure 4:
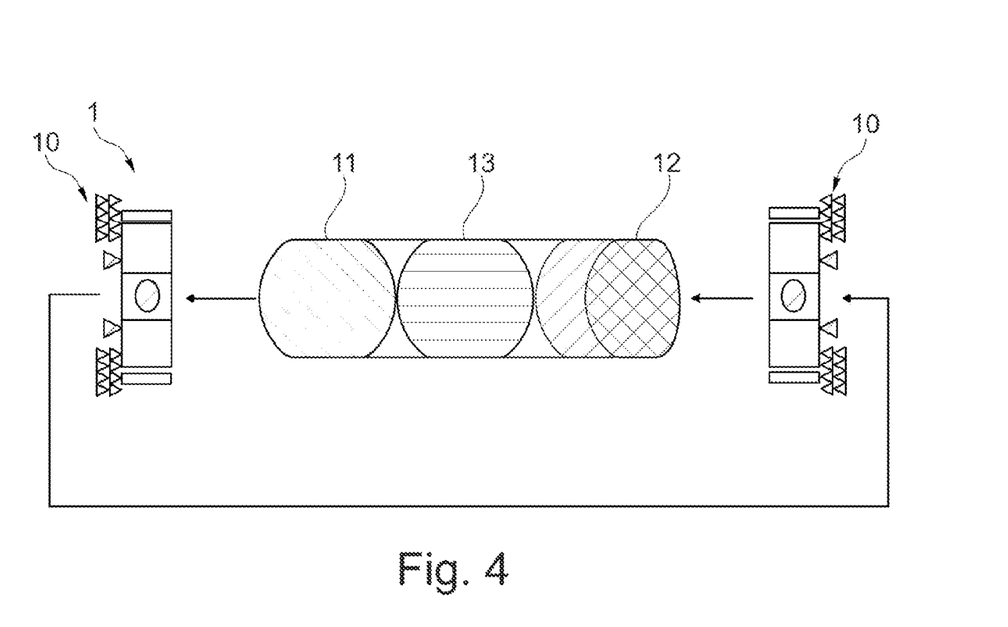
FIG. 4 represents a schematic view of the spacecraft in a step of decoupling the main structure from the first container and the main structure coupling to the second container for landing on the celestial body according to the present disclosure.
Figure 5:
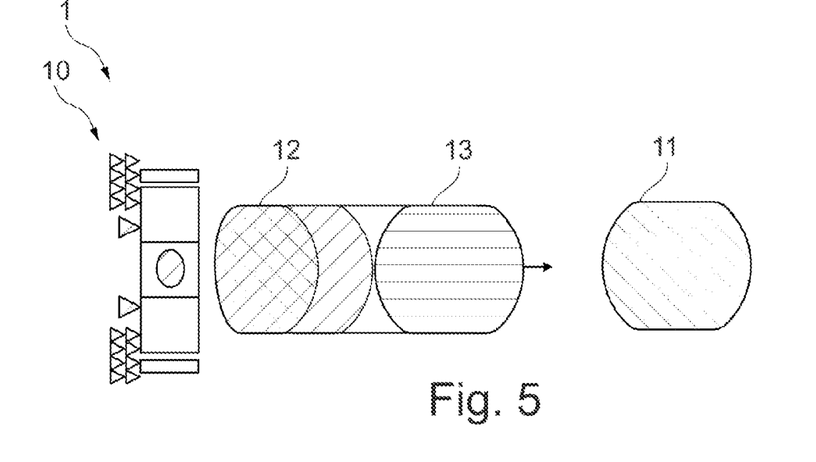
FIG. 5 represents a schematic view of a step of decoupling the first container from the payload for landing on the celestial body according to the present disclosure.

As shown in FIG. 4, the main structure 10 is then decoupled from the first container 11 and the main structure 10 is controlled to facilitate the coupling of the main structure 10 to the second container 12. Then, the first container 11 can be decoupled from the second container 12 (FIG. 5). The spacecraft 1 thus configured comprises the supporting structure 13 of the payload coupled to the second container 12. The spacecraft 1 is suitable for carrying out a landing phase of the spacecraft 1 on the ground of the celestial body since the spacecraft 1 facilitates the use of the chemical propulsion.

Figure 6:
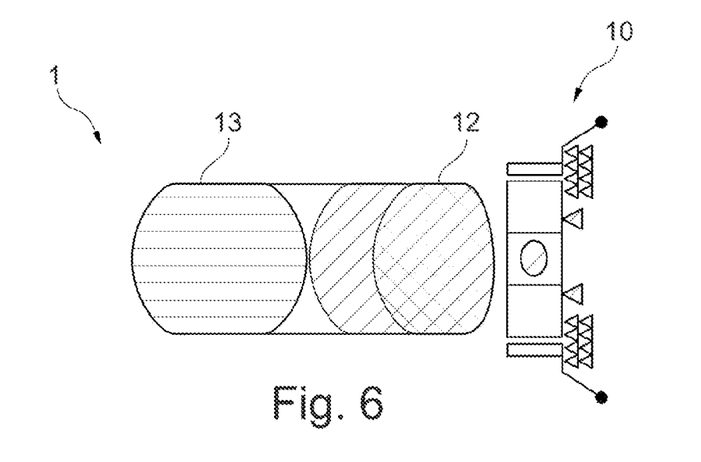
FIG. 6 represents a schematic view of a step of reorienting the spacecraft for landing on the celestial body according to the present disclosure.
Figure 7:
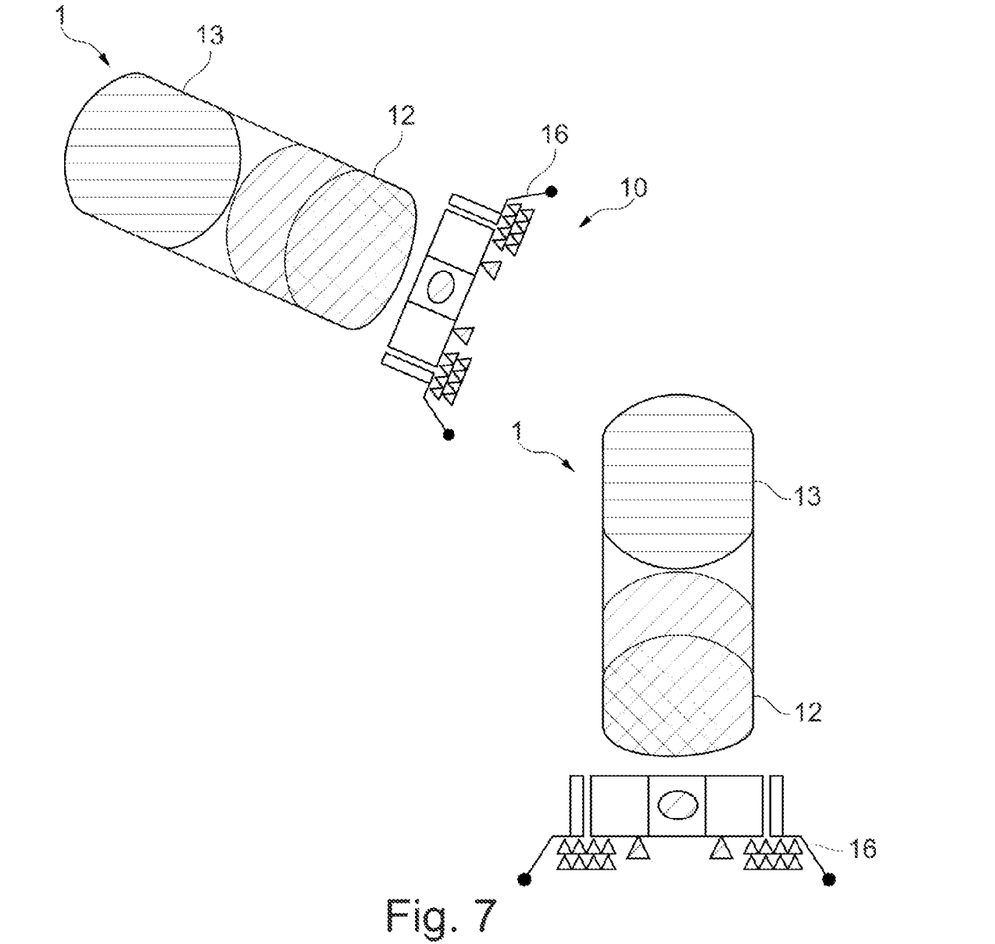
FIG. 7 represents a schematic view of a step of descending the spacecraft for landing on the ground of the celestial body according to the present disclosure.

FIG. 6 illustrates reorienting the spacecraft 1 in orbit to prepare the exit of the spacecraft 1 from orbit and the landing of the spacecraft 1 on the celestial body. FIG. 7 illustrates the landing phase of the spacecraft 1 on the celestial body. The spacecraft 1 illustrated in FIGS. 6 and 7 comprises the landing gear 16 in the open position.

Figure 8:
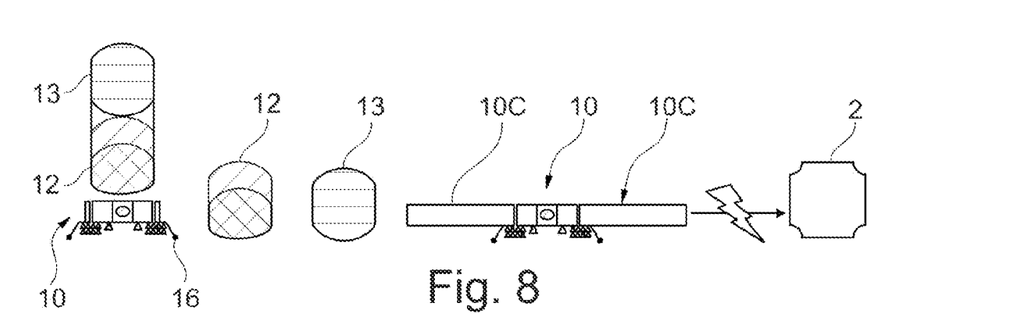
FIG. 8 represents a schematic view of steps of unloading the spacecraft and distributing the electrical energy supplied by the solar electrical energy generator to a client craft according to the present disclosure.

As shown in FIG. 8, once on the ground, the spacecraft 1 can be unloaded from the second container 12 and from the supporting structure 13 comprising the payload to the site where the client craft 2 is located. The solar electrical energy generator 10C can then be deployed for the distribution of electrical energy to the client craft 2. The spacecraft 1 can once again carry out an electrical energy distribution mission successively to the one the spacecraft 1 has just accomplished. For example, the spacecraft 1 can be directed towards another celestial body on which a third client craft 2 is placed on the ground. For directing the spacecraft 1 towards another celestial body, the solar generator 10C is previously retracted. At least one third container 14 is provided, which can be attached to the main structure 10 or be provided from the site on which the second client craft 2 is located.

Figure 9:
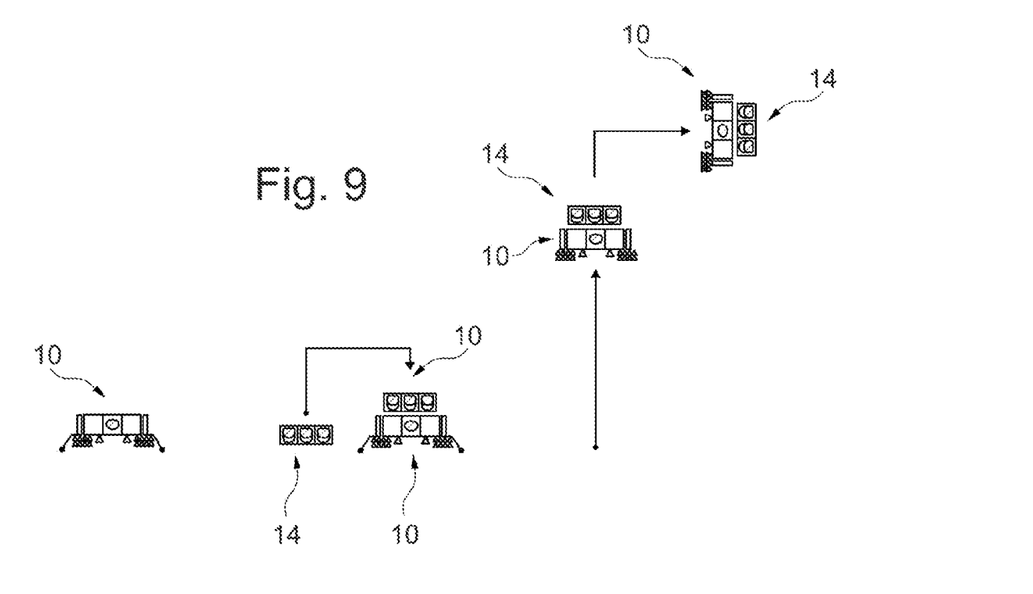
FIG. 9 represents a schematic view of steps of launching the spacecraft into orbit from the ground of the celestial body according to the present disclosure.

FIG. 9 illustrates placing the spacecraft 1 in orbit from the ground of the celestial body comprising the second client craft 2. When the spacecraft 1 is placed into orbit, the landing gear 16 is closed in the retracted position. The main structure 10 previously separated from the supporting structure 13 and the second container 12 can then receive the third container 14 comprising a fuel for the chemical propulsion. The main structure 10 can then be supplied with fuel for the chemical propulsion to facilitate the take-off of the spacecraft 1 and the placement of the spacecraft 1 into orbit around the celestial body from which the spacecraft 1 takes off.

Figure 10:
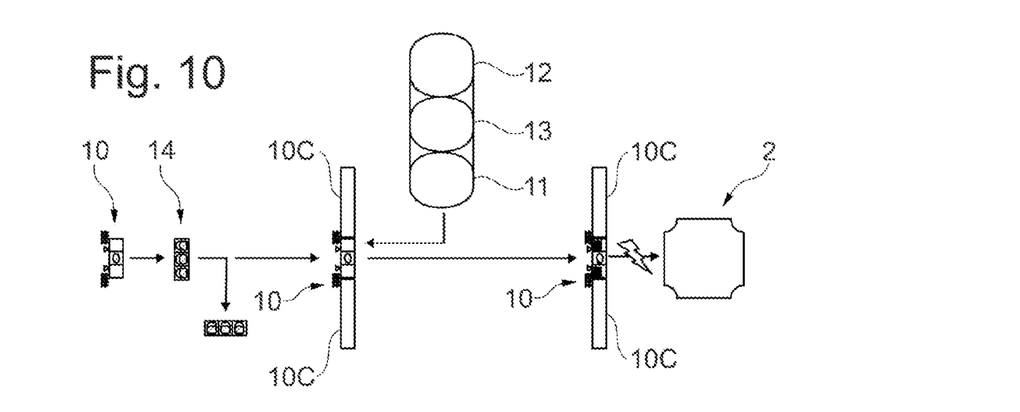
FIG. 10 represents a schematic view of steps of refueling the spacecraft before sending the spacecraft to another client craft according to the present disclosure.

FIG. 10 illustrates the preparation of the spacecraft 1 for continuing the electrical energy distribution mission of the spacecraft 1 towards the destination of a third client craft 2. Once in orbit, as previously described, the third container 14 is separated from the main structure 10. Then, the solar generator 10C is deployed. Finally, the main structure 10 can be coupled to another first container 11 of a new logistic stack planned for the following mission or alternatively fuel transfer systems can provide the fuel supply of the first container 11 and the second container 12 previously recovered.

The new logistic stack can be similar to the initial configuration, namely: a first container 11, a second container 12 and a supporting structure 13 arranged between the two containers 11, 12. Then the newly formed spacecraft 1 can be driven towards the third client craft 2 on the second celestial body according to the steps previously described.

Figure 11:
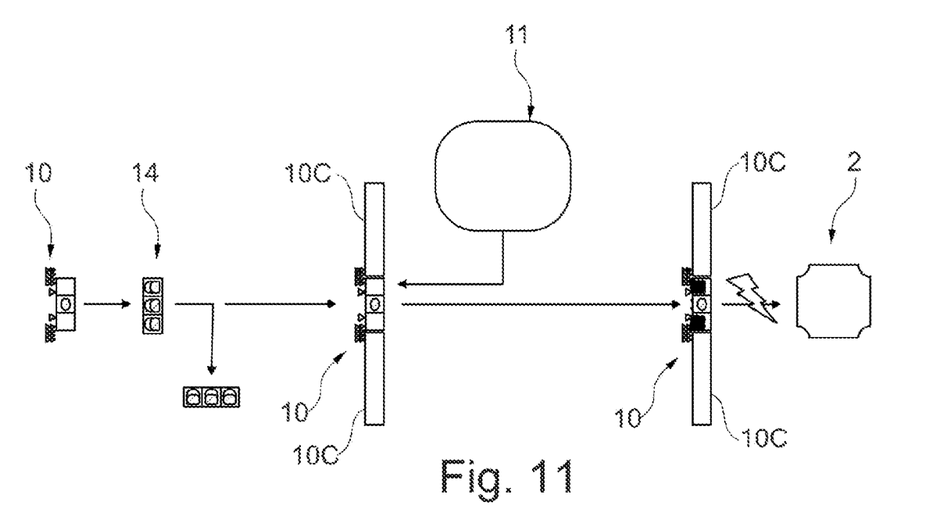
FIG. 11 represents a schematic view of steps of refueling the spacecraft before sending the spacecraft to another client craft according to a variant of the present disclosure.

In a form illustrated by FIG. 11, the main structure 10 can be coupled to another first fuel container 11 intended for the electric thruster 10A, provided for the following mission. A step of transferring the spacecraft 1 to a client craft 2 can then be initiated using the electric propulsion powered by the electrical energy supplied by the deployed solar generator 10C and by the fuel from the first container 11 to which the main structure 10 is coupled.

FIGS. 12 to 16 are views of the main structure 10 according to a form.

Figure 12:
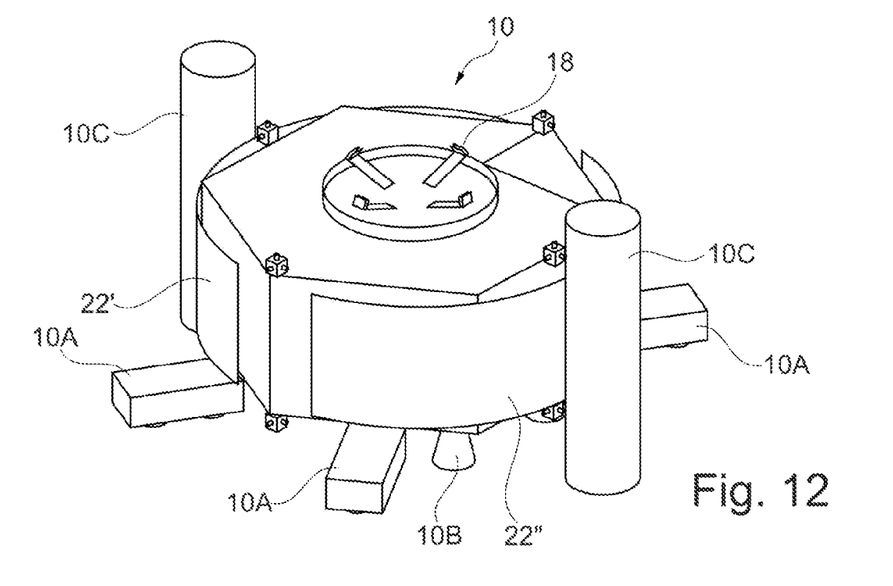
FIG. 12 is an enlarged isometric view of the main structure of the spacecraft comprising a solar electrical energy generator in the retracted position, according to a form of the present disclosure.

FIG. 12 represents the main structure 10 in orbit, in which the solar generator 10C of electrical energy with variable geometry is retracted. In the form illustrated in FIG. 12, the solar electrical energy generator 10C comprises two canvases each formed of one or more flexible photovoltaic cells, and which are each wound about the same axis.

The main structure 10 comprises the electric thruster 10A or electric propulsion unit comprising a plurality of electric motors.

The main structure 10 comprises the chemical thruster 10B or chemical propulsion unit including a plurality of chemical motors.

The main structure 10 comprises a mooring and fuel transfer system 18 configured to provide a coupling/decoupling between the main structure 10 and the fuel containers 11, 12, 14 to provide the transfer of fuel.

In the form illustrated in FIG. 12, the landing gear 16 is retracted into the retracted position (not visible).

Figure 13:
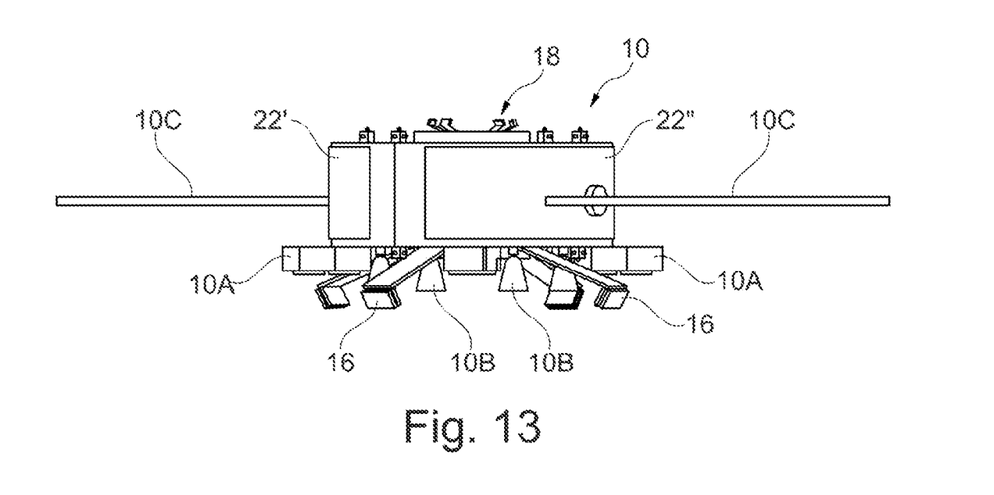
FIG. 13 is an enlarged side view of the main structure of the spacecraft representing the solar electrical energy generator in the deployed position, according to a form of the present disclosure.

FIG. 13 illustrates the main structure 10 on the ground, for example, placed on the ground of a celestial body in which the solar electrical energy generator 10C with variable geometry is deployed.

In the form illustrated by FIGS. 13 to 16, the solar electrical energy generator 10C comprises two canvases of flexible photovoltaic cells which are each unwound.

The landing gear 16 is deployed, in the open position, to provide the landing of the main structure 10 and maintenance of the main structures 10 on the ground of a celestial body (such as the Moon).

Figure 14:
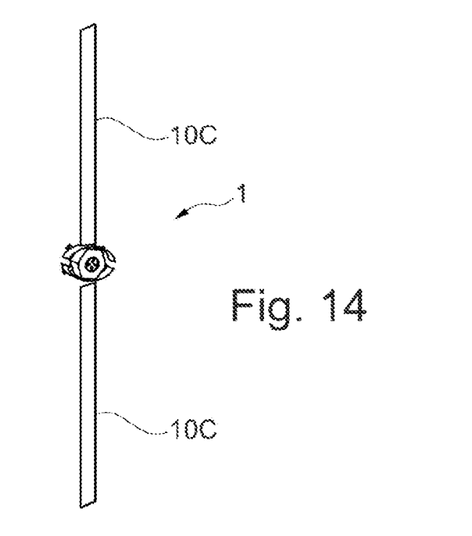
FIG. 14 is a top view of the main structure of the spacecraft and the solar electrical energy generator in the deployed position, according to a form of the present disclosure.
Figure 15:
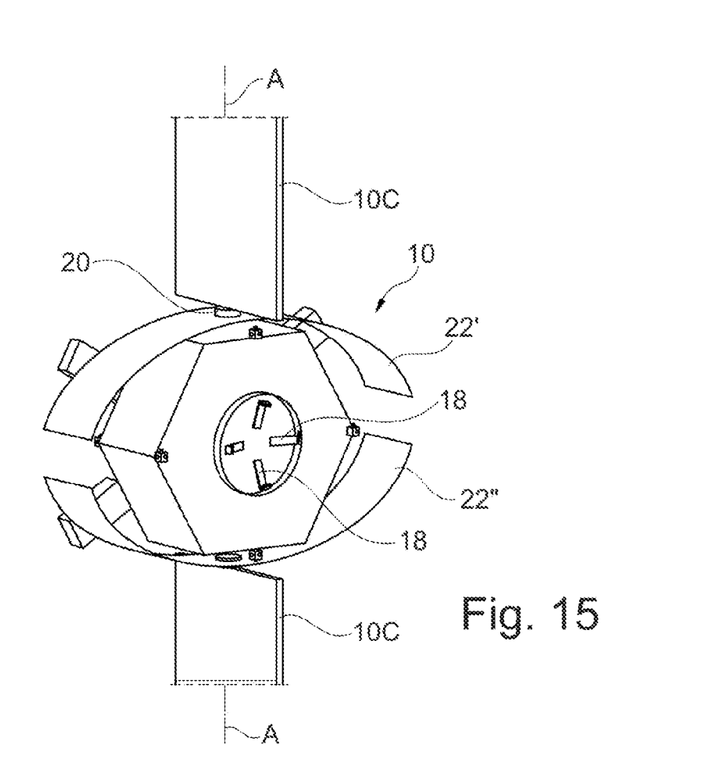
FIG. 15 is an enlarged top view of the main structure of the spacecraft shown in FIG. 14 according to the present disclosure.

FIGS. 14 and 15 are top views of the main structure 10 with the solar electrical energy generator 10C with deployed variable geometry.

Figure 16:
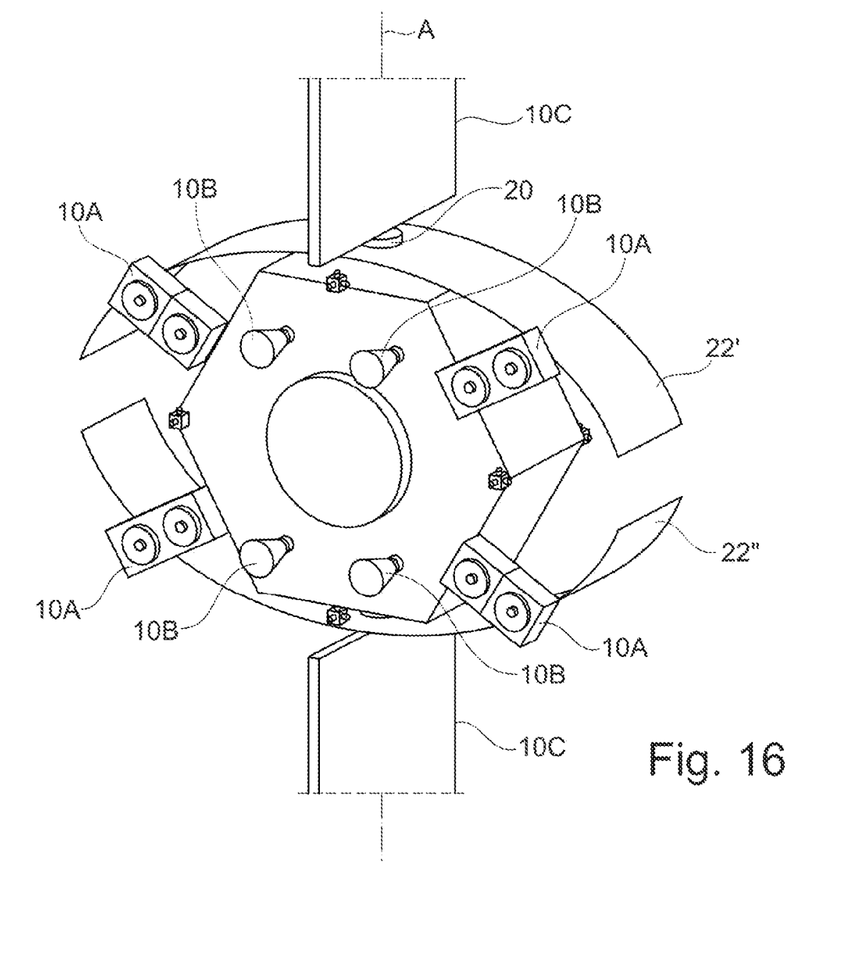
FIG. 16 is an enlarged bottom view of the main structure of the spacecraft shown in FIG. 14 according to the present disclosure.

In the form illustrated by FIGS. 12, 13 and 16, the main structure 10 comprises an electric thruster 10A including several electric motors forming an electric propulsion unit.

The main structure 10 comprises a chemical thruster 10B including the chemical motors forming a chemical propulsion unit.

As illustrated in FIG. 15, the main structure 10 may comprise a rotating orientation device 20 to drive the solar electrical energy generator 10C in rotation about a vertical or longitudinal axis A. For example, the rotating device 20 is configured to cause the rotation of the winding of photovoltaic cells over 360° about the longitudinal or vertical axis A. The rotating device facilitates the tracking of the position of the sun and orientation of the photovoltaic cells towards the sun.

In the forms illustrated by FIGS. 12 to 16, the spacecraft 1 comprises an optional energy dissipation device. For example, the energy dissipation device comprises two radiators 22', 22" which each extend over half of the surface of the main structure 10 to offer an increased available surface around the main structure 10.

The present description is not limited to the examples which have just been described and numerous adjustments can be made to these examples without departing from the scope of the appended claims. In one aspect, the different characteristics, shapes, variants, and forms can be associated with each other in various combinations to the extent that they are not incompatible or exclusive of each other. In one aspect, all the variants and forms described above can be combined with each other.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A spacecraft for distributing electrical energy to a client craft, the spacecraft comprising:
    a main structure equipped with an electric thruster, a chemical thruster, and a solar electrical energy generator;
    a first fuel container configured for use by the electric thruster; and
    a second fuel container configured for use by the chemical thruster, wherein the spacecraft is modular to removably couple the main structure alternately to the first fuel container for supplying fuel to the electric thruster, or to the second fuel container for supplying fuel to the chemical thruster, and to removably couple the first fuel container and the second fuel container to each other, and wherein the solar electrical energy generator has a variable geometry configured to be:
        movable between a retracted position and a deployed position, the solar electrical energy generator in the deployed position being configured to produce and distribute electrical energy to the electric thruster and to the client craft located at a first point in free space, in orbit or on a first celestial body.

2. The spacecraft according to claim 1, wherein the solar electrical energy generator comprises flexible photovoltaic cells configured to be wound and unwound about an axis.

3. The spacecraft according to claim 1, wherein the solar electrical energy generator is equipped with a system of transferring the electrical energy by at least one of wire, short distance waves, and laser.

4. The spacecraft according to claim 1, comprising a supporting structure for carrying a payload, the supporting structure being configured to be coupled and decoupled from the first fuel container and the second fuel container.

5. The spacecraft according to claim 1, wherein the main structure is configured to be coupled to a third fuel container after being separated from a supporting structure and the second container, the third container being configured for use by the chemical thruster to facilitate the spacecraft to go back into orbit from a celestial body.

6. The spacecraft according to claim 1, wherein the main structure comprises docking systems configured to couple the spacecraft to the client craft.

7. The spacecraft according to claim 1, wherein the main structure comprises landing systems configured to facilitate the spacecraft to land on a celestial body.

8. The spacecraft according to claim 1, comprising fuel transfer systems to provide refueling of the spacecraft.

9. The spacecraft according to claim 1, wherein the electric thruster, the chemical thruster, the solar electrical energy generator, the first fuel container and the second fuel container are configured to:
    displace the spacecraft in the free space towards the client craft located in the free space, in orbit or on a celestial body, when the solar electrical energy generator is in the deployed position, and
    carry out a mooring phase with the client craft in the free space or in orbit, and a landing phase towards the celestial body and a taking-off phase from the celestial body for a return to orbit, when the solar electrical energy generator is in the retracted position.

10. A method for distributing electrical energy to a client craft located at a point in free space, in orbit or on a celestial body, using a spacecraft, the method comprising:
    transiting the spacecraft placed in orbit, towards the client craft located in the free space, in orbit or on a celestial body, by using an electric thruster and a solar electrical energy generator of the spacecraft; and
    setting the solar electrical energy generator having a variable geometry in a deployed position to produce and distribute electrical energy to the electric thruster and to the client craft,
    wherein the spacecraft is modular and comprises:
    a main structure equipped with the electric thruster, a chemical thruster and the solar electrical energy generator,
    a first fuel container configured for use by the electric thruster, and
    a second fuel container configured for use by the chemical thruster,
    wherein the main structure is configured to be removably coupled alternately to the first fuel container for supplying fuel to the electric thruster, or to the second fuel container for supplying fuel to the chemical thruster, the first fuel container and the second fuel container being configured to be removably coupled to each other, and wherein the solar electrical energy generator is configured to be movable between a retracted position and the deployed position.

11. The method according to claim 10, the method further comprising:
   docking the spacecraft to the client craft located in the free space or in orbit; and
   distributing the electrical energy produced by the solar electrical energy generator to the client craft.

12. The method according to claim 10, the method further comprising:
   transiting the spacecraft into orbit around the celestial body;
   setting the solar electrical energy generator in the retracted position:
   decoupling the first fuel container from the main structure of the spacecraft;
   coupling the main structure to the second fuel container;
   decoupling the first fuel container from the second fuel container;
   landing the spacecraft on a ground of the celestial body;
   setting the solar electrical energy generator in the deployed position; and
   distributing the electrical energy generated by the solar electrical energy generator to the client craft on the celestial body.

13. The method according to claim 12, wherein, in a case of a continuation of a mission of distributing electrical energy to another client craft, the method comprises:
   setting the solar electrical energy generator in the retracted position:
   filling the second fuel container, or alternatively coupling a third container to the main structure to supply fuel to the chemical thruster; and
   taking-off from the celestial body to bring the spacecraft into orbit around the celestial body.

14. The method according to claim 13, comprising:
   decoupling the third container from the main structure;
   refueling, in orbit or in the free space, the electric thruster and the chemical thruster; and
   transiting the spacecraft to the other client craft.

15. The method according to claim 10, further comprising using the electric thruster, the chemical thruster, the solar electrical energy generator, the first fuel container and the second fuel container to:
   displace the spacecraft in the free space towards the client craft located in the free space, in orbit or on a celestial body, when the solar electrical energy generator being set in the deployed position, and
   carry out a mooring phase with the client craft in the free space or in orbit, or carry out a landing phase on the celestial body, or carry out a taking-off phase from the celestial body for a return to orbit, when the solar electrical energy generator being set in the retracted position.

16. The method according to claim 10, comprising:
   decoupling a third container from the main structure;
   refueling, in orbit or in the free space, the electric thruster and the chemical thruster; and
   transiting the spacecraft to another client craft.

* * * * *